Patented Apr. 12, 1932

1,853,341

UNITED STATES PATENT OFFICE

ALEXANDER DJIDICH, OF TAMAQUA, PENNSYLVANIA

ANTIRUST SOLUTION FOR RADIATORS

No Drawing.   Application filed January 15, 1930.   Serial No. 421,073.

This invention relates to a composition of matter for use in automobile radiators, and acting as an anti-rust and cleansing solution.

It is a further object of the invention to provide a solution of this character, which is miscible with alcohol, Prestone, or any other of the standard anti-freeze solutions commonly used in automobile radiators.

In carrying out the process of manufacturing my improved anti-rust solution, I proceed as follows:

I mix with soda ash sufficient water to form a saturated solution, and I dissolve enough copper sulphate (blue stone) in water, to make a saturated solution of the copper sulphate. I add a small quantity of the copper sulphate solution, say one ounce to eight ounces of the saturated soda ash solution and thoroughly mix the same. This composition is sufficient to treat five gallons of the water used in an automobile radiator and, when placed in an automobile radiator, or the cooling system of any internal combustion engine, not only acts to clean the system of accumulated rust and scale, but prevents the formation of any additional rust at any time. In addition, the copper sulphate exercises a slight copper plating effect, which further aids in protecting the metal surfaces and tends to seal any small leaks which may be present.

The solution in question has a distinct soapy or oily characteristic, and aids in lubricating the bearings of the circulating pump of the system. While I, preferably, use soda ash because of its cheapness, I may use, in lieu thereof, carbonate of soda $Na_2CO_3.10H_2O$, sodium hydroxide NaOH, or any of the derivatives of natrium forming alkaline solutions.

When a solution of the character of that herein described is placed in a radiator at the time of the beginning of the use of the same, i. e. when it is new, the radiator will always remain like new, as far as its internal surfaces are concerned. That is to say, it will never become rusty and never become foul. While I have stated that I use approximately one part of the saturated solution of blue stone to eight parts of the soda ash or equivalent solution, it is to be understood that the invention is not limited in this respect, because other proportions may be employed, if desired.

While I, preferably, market this product in the form of a solution, and in bottles, it is to be understood that it may be marketed in the form of a powder, cake or paste. For example, the product could be mixed with a soap in such proportions as to bring it to cake or paste form. When marketed as a powder, the copper sulphate and soda ash could be intermixed in proper portions and then the whole sold as a powder, ready for use by merely placing it in the proper quantity of water.

It is further to be understood that the invention includes within its purview any changes which fairly come within either the terms or the spirit of the appended claims.

Having described my invention, what I claim is:

1. A product of the character described, consisting of copper sulphate, and a derivative of natrium forming an alkaline solution.

2. A solution of the character described, consisting of intermixed saturated solutions of copper sulphate and a derivative of natrium forming an alkaline solution.

3. A solution of the character described, consisting of intermixed solutions of copper sulphate and a derivative of natrium forming an alkaline solution.

4. A solution of the character described, consisting of a saturated solution of copper sulphate and a saturated solution of soda ash.

5. A solution of the character described, consisting of a saturated solution of copper sulphate and a saturated solution of soda ash in the proportions of eight parts of soda ash to one part of the copper sulphate.

6. The herein described process of making an anti-rust solution, which consists of making a saturated solution of copper sulphate and a saturated solution of a derivative of natrium, and intermixing portions of the two saturated solutions.

7. The herein described process of making an anti-rust solution, which consists of making a saturated solution of copper sulphate and a saturated solution of a derivative of natrium, and intermixing portions of the two saturated solutions in proportions wherein the copper sulphate is in materially smaller amount than the other solution.

In testimony whereof I affix my signature.

ALEXANDER DJIDICH.